US011461233B2

(12) United States Patent
Lam et al.

(10) Patent No.: US 11,461,233 B2
(45) Date of Patent: *Oct. 4, 2022

(54) HANDLING ASYNCHRONOUS POWER LOSS IN A MEMORY SUB-SYSTEM THAT PROGRAMS SEQUENTIALLY

(71) Applicant: Micron Technology, Inc., Boise, ID (US)

(72) Inventors: Johnny A. Lam, Firestone, CO (US);
Alex J. Wesenberg, Erie, CO (US);
Michael Winterfeld, Firestone, CO (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/233,026

(22) Filed: Apr. 16, 2021

(65) Prior Publication Data

US 2021/0342267 A1 Nov. 4, 2021

Related U.S. Application Data

(63) Continuation of application No. 15/929,405, filed on Apr. 30, 2020, now Pat. No. 10,990,526.

(51) Int. Cl.
*G06F 12/0804* (2016.01)
*G06F 12/1009* (2016.01)

(52) U.S. Cl.
CPC ...... *G06F 12/0804* (2013.01); *G06F 12/1009* (2013.01); *G06F 2212/1032* (2013.01)

(58) Field of Classification Search
CPC ............ G06F 12/0804; G06F 12/1009; G06F 2212/1032
See application file for complete search history.

(56) References Cited

U.S. PATENT DOCUMENTS

| | | |
|---|---|---|
| 7,624,239 B2 | 11/2009 | Bennett et al. |
| 9,836,232 B1 | 12/2017 | Vasquez et al. |
| 9,921,898 B1 | 3/2018 | Miller et al. |
| 10,552,341 B2 | 2/2020 | Baptist et al. |
| 10,733,098 B2 | 8/2020 | Sundrani et al. |
| 10,990,526 B1 | 4/2021 | Lam et al. |
| 2007/0113030 A1 | 5/2007 | Bennett et al. |

(Continued)

OTHER PUBLICATIONS

PCT Notification of Transmittal of The International Search Report and The Written Opinion Of The International Searching Authority for PCT Application No. PCT/US2021/029989, dated Aug. 23, 2021, 10 pages.

*Primary Examiner* — Prasith Thammavong
(74) *Attorney, Agent, or Firm* — Lowenstein Sandler LLP

(57) ABSTRACT

A system includes a non-volatile memory (NVM), and a volatile memory to store: a zone map data structure (ZMDS) that maps a zone of a logical block address (LBA) space to a zone index; and a high frequency update table (HFUT). A processing device is to: write, within an entry of the HFUT, a value of a zone write pointer corresponding to the zone index for an active zone, wherein the zone write pointer includes a location in the LBA space for the active zone; write, within an entry of the ZMDS, a table index value that points to the entry of the HFUT; and journal metadata of the entry of one the ZMDS or the HFUT affected by a flush transition between the ZMDS and the HFUT.

20 Claims, 10 Drawing Sheets

(56) References Cited

U.S. PATENT DOCUMENTS

| | | | |
|---|---|---|---|
| 2010/0030999 A1* | 2/2010 | Hinz | G06F 3/0679 |
| | | | 711/E12.001 |
| 2012/0254503 A1 | 10/2012 | Chiu et al. | |
| 2014/0209004 A1 | 7/2014 | Cohen et al. | |
| 2015/0370702 A1 | 12/2015 | Voigt | |
| 2016/0342509 A1* | 11/2016 | Kotte | G06F 12/0638 |
| 2017/0344474 A1* | 11/2017 | Zhou | G06F 12/0646 |
| 2019/0073251 A1 | 3/2019 | Miller et al. | |
| 2019/0196960 A1* | 6/2019 | Lin | G06F 3/0679 |
| 2019/0227884 A1 | 7/2019 | Li et al. | |
| 2019/0346902 A1 | 11/2019 | D'Eliseo | |
| 2019/0347015 A1 | 11/2019 | Luo et al. | |
| 2019/0391747 A1 | 12/2019 | Sheperek et al. | |
| 2020/0379915 A1* | 12/2020 | Moertl | G06F 3/0626 |

\* cited by examiner

500

```
┌─────────────────────────────────────────────────────────────────┐
│ Write, responsive to a write request, to an active zone of the │
│ LBA space, where the active zone is mapped within a mapping    │
│ data structure to a corresponding physical address space of an │
│ NVM device.                                                     │
│ 520                                                             │
└─────────────────────────────────────────────────────────────────┘
                                │
                                ▼
┌─────────────────────────────────────────────────────────────────┐
│ Write, within an entry of the high frequency update table      │
│ stored in a volatile memory, a value of a write pointer for a  │
│ location in the NVM device corresponding to writing within the │
│ active zone.                                                    │
│ 530                                                             │
└─────────────────────────────────────────────────────────────────┘
                                │
                                ▼
┌─────────────────────────────────────────────────────────────────┐
│ Write, within an entry of the mapping data structure, a table  │
│ index value that points to the entry of the high frequency     │
│ update table.                                                   │
│ 540                                                             │
└─────────────────────────────────────────────────────────────────┘
                                │
                                ▼
┌─────────────────────────────────────────────────────────────────┐
│ Update, within a journal data structure stored in the volatile │
│ memory, metadata of the entry of at least one of the mapping   │
│ data structure or the high frequency update table affected by  │
│ a flush transition between the mapping data structure and the  │
│ high frequency update table.                                    │
│ 550                                                             │
└─────────────────────────────────────────────────────────────────┘
                                │
                                ▼
┌─────────────────────────────────────────────────────────────────┐
│ In response to an asynchronous power loss (APL) event, flush   │
│ the journal data structure and the high frequency update table │
│ to the NVM device.                                              │
│ 560                                                             │
└─────────────────────────────────────────────────────────────────┘
```

Write, responsive to a write request, to an active zone of LBA space, the active zone being mapped, within a zone map data structure, to a zone state and to a zone index within the LBA space.
620

Write, within an entry of the high frequency update table stored in a volatile memory, a value of a zone write pointer corresponding to the zone index, wherein the zone write pointer comprises a location in the active zone.
630

Write, within an entry of the zone map data structure, a table index value that points to the entry of the high frequency update table.
640

Update, within the journal data structure stored in the volatile memory, metadata of the entry of at least one of the zone map data structure or the journal data structure affected by a flush transition between the zone map data structure and the high frequency update table.
650

In response to an asynchronous power loss (APL) event, flushing the journal data structure and the high frequency update table to the NVM device.
660

- Compare of CWP and SWP values. 802 (from FIG. 7)
- Active Zone Table Verified? 810 — N → 805; Y ↓
- Verify States, IDX matches Active Zone Table. 815
- Zone Map DS Verified? 820 — N → 805; Y ↓
- Compare Write Tracker Table with Active Zone Table. 825
- Write Tracker Table Verified? 830 — N → 805; Y ↓
- Verify counts in pools. 835
- Block Set Info Verified? 840 — N → 805; Y ↓
- BSID, Idx matches Active Zone Table and Block Set Info. 845
- ZTBS DS Verified? 850 — N → 805; Y ↓
- Check blocks are valid and errors detected. 855
- Block Set Map DS Verified? 860 — N → 805; Y ↓
- Notify - boot complete. 870

805: Conduct Minor Repairs and Possibly Scan of Active Zones to Correct DS's/Tables.

HANDLING ASYNCHRONOUS POWER LOSS IN A MEMORY SUB-SYSTEM THAT PROGRAMS SEQUENTIALLY

RELATED APPLICATION

This application is a continuation of U.S. patent application Ser. No. 15/929,405, filed Apr. 30, 2020, which is herein incorporated by reference in its entirety.

TECHNICAL FIELD

Embodiments of the disclosure relate generally to memory sub-systems, and more specifically, handling asynchronous power loss in a memory sub-system that programs sequentially.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

FIG. 5 is a flow chart of a method for efficiently handling APL within a memory sub-system that programs sequentially according to an embodiment.

FIG. 6 is a flow chart of a method for efficiently handling APL within a memory sub-system that programs sequentially according to another embodiment.

FIG. 8 is a flow chart of a method for verification of the recovered mapping data structures after reboot from an APL according to an embodiment.

DETAILED DESCRIPTION

Figure 1A:
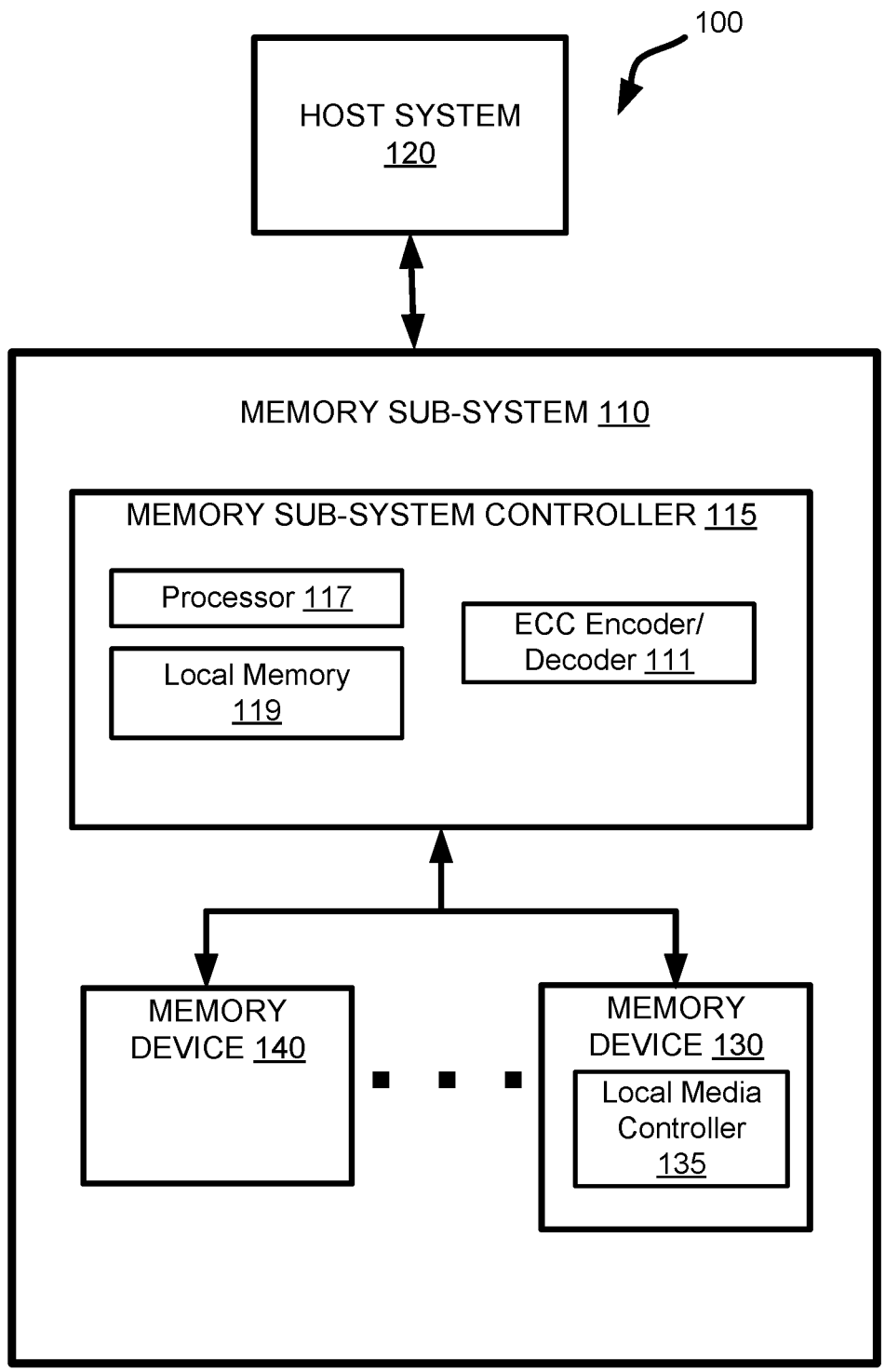
FIG. 1A illustrates an example computing system that includes a memory sub-system according to embodiments.

Aspects of the present disclosure are directed to handling asynchronous power loss in a memory sub-system that programs sequentially. A memory sub-system can be a storage device, a memory module, or a hybrid of a storage device and memory module. Examples of storage devices and memory modules are described below in conjunction with FIG. 1A. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. One example of non-volatile memory devices is a negative-and (NAND) memory device. Other examples of non-volatile memory devices are described below in conjunction with FIG. 1A. A non-volatile memory device is a package of one or more dice. The dice in the packages can be assigned to one or more channels for communicating with a memory sub-system controller. Each die can consist of one or more planes. Planes can be grouped into logic units (LUN). For some types of non-volatile memory devices (e.g., NAND devices), each plane consists of a set of physical blocks. Each block consists of a set of pages. Each page consists of a set of memory cells ("cells"). A cell is an electronic circuit that stores information. A block hereinafter refers to a unit of the memory device used to store data and can include a group of memory cells, a word line group, a word line, or individual memory cells.

Data operations can be performed by the memory sub-system. The data operations can be host-initiated operations. For example, the host system can initiate a data operation (e.g., write, read, erase, etc.) on a memory sub-system. The host system can send access requests (e.g., write command, read command) to the memory sub-system, such as to store data in the memory device at the memory sub-system and to read data from the memory device of the memory sub-system.

The data to be read or written, as specified by a host request, is hereinafter referred to as "host data." A host request can include logical address information (e.g., logical block address (LBA), namespace) for the host data, which is the location the host system associates with the host data. The logical address information (e.g., LBA, namespace) can be part of metadata for the host data. Metadata can also include error handling data (e.g., ECC codeword, parity code), data version (e.g. used to distinguish age of data written), valid bitmap (which LBAs or logical transfer units contain valid data), and the like. For simplicity, where "data" is referred to hereafter, such data can be understood to refer to at least host data, but can also refer to other data such as media management data and/or system data.

The cells (or simply "media") of memory devices can be organized hierarchically from die (upper level), to plane, to block, to page (lower level). A block set (also referred to as a block stripe) can be a set of blocks arrayed across planes of different dies, such that the blocks are grouped together for purposes of data storage. Writing to block sets allows more host data that can be concurrently written and read at the same time across multiple dies. Multiple blocks of one or more block set can be identified as a data group.

In various embodiments, a host file system can group host data by locality and write the host data sequentially to memory sub-systems. File systems can then write host data of different localities as parallel sequential streams to memory sub-systems, each stream having its own locality, e.g., where different host applications can each write to its own stream. "Locality" can refer to either temporal locality or spatial locality. Memory sub-system controllers (e.g., that include a processing device) usually write to media randomly in portions of host data (e.g., 4 KB), and then use metadata to map LBA space to the physical address space of the media. When a larger group of host data (e.g., 100 MB or more) is written grouped with data locality, however, the "data group" can be sequentially written as a larger chunk to one or more block sets across multiple dies. In order to simplify mapping of such data groups, LBAs of a zone (e.g., logical address space associated with a data group) can be sequentially ordered within the LBA space and be mapped to sequentially ordered physical addresses within the physical address space. Memory sub-systems that can write (e.g., program) zones of data at a time and map the zones accordingly operate in zone namespace (ZNS), e.g., where a zone of logical addresses are named/identified as a group. Advantageously, use of ZNS for logical-to-physical (LTP) address mapping greatly reduces the amount of metadata to track the LTP mapping.

Asynchronous power loss (APL) occurs when a memory device is operational and unexpectedly loses power. Memory devices are designed to handle APL events so that data stored in volatile memory is not lost. Common techniques include taking snapshots of a data structure stored in volatile memory, journaling metadata to capture recent changes to the data structure, and flushing journals upon detection of APL so that the data structure can be rebuilt. The concept of journaling is to buffer metadata in a smaller data structure that can be used to rebuild the larger data structure. Flushing is the act of writing data out to non-volatile memory (NVM) to preserve the data upon power loss.

Conventional memory devices handle APL in different ways, seeking to balance different characteristics of APL such as the amount of data to flush to NVM, number of power capacitors to use to retain the volatile memory data, boot and APL repair time, as well as write amplification involved with backing up data (e.g., taking snapshots and flushing data). Traditional memory devices depend on snapshots of logical-to-physical (LTP) mapping data structures and continuously flushing numerous journals to make sure data is coherent after APL. This includes use of techniques such as scanning an open block set (e.g., block stripe) and repairing the open block set.

Given the nature of sequentially writing to an NVM device, mapping in a ZNS-based memory sub-system can be simplified in a way that also simplifies APL design and techniques to ensure data structures are coherently recovered and, if necessary, repaired. For example, a host write pattern is sequential within a zone and uses an atomic write unit to guarantee that grouped data is written sequentially. Further, the use of power capacitors can allow a certain amount of host data to be flushed after an APL occurs depending on the number of power capacitors deployed. Additionally, the mapping data structures store sequential mappings of sequentially written zones at a greater granularity such that the mapping data structures can be smaller.

Even with ZNS-related advantages, the number of active zones being requested by ZNS customers further complicates APL design. Active zones are open and have a continuously incremented write pointer while the rest of the zones (e.g., non-active zones) have write pointers that are not moving. This makes APL particularly challenging when using traditional techniques such as snapshot, journaling, and scanning to determine where the last written locations are for the multiple active zones. Further, the snapshot and continuously flushing of journals increase write amplification for a chunk of data that is not being actively modified.

Aspects of the present disclosure address the above and other deficiencies by employing a high frequency update table (HFUT) in addition to a journal data structure to coherently track metadata indicative of changes to mapping data structures stored in volatile memory. The HFUT, and possibly the journal data structure as well, can be stored in tightly coupled memory (TCM), and thus be updated quickly, improving performance. The HFUT can be employed to track a write pointer and optionally also an index corresponding to the write pointer for active zones that are being written, whether in the LBA space or the physical address space. Because the HFUT is updated only for write pointers in active zones, the HFUT is made smaller than the additional storage space that would otherwise be required to maintain all write pointers in a mapping data structure. Use of the HFUT, therefore, reduces the size of the mapping data structure, making the flush of the mapping data structure in response to an APL event reasonable and less impactful in terms of power capacitors and write amplification.

For example, in one embodiment, the mapping data structure is a zone map data structure that maps a zone of the LBA space to a zone state and to a zone index within the LBA space. In this embodiment, the write pointer can correspond to a zone write pointer submission value and a zone write pointer completion value. The HFUT in this embodiment can be an active zone table that stores the zone write pointer submission value and the zone write pointer completion value for each active zone.

In another embodiment, the mapping data structure is a zone-to-block-set (ZTBS) data structure that maps a zone identifier to a block set identifier. In this embodiment, the write pointer is a value related to a location in the NVM device corresponding to writing within the active zone, and thus points to the physical address space. The HFUT can be a write tracker table (WTT) to store a last written page (LWP) value of the NVM device corresponding to the write pointer.

In these embodiments, changes to a state of an active zone and of a write pointer that points within the active zone are flushed in transitions between the mapping data structure and the HFUT. These changes cause updates within the journal data structure at flush transitions between the mapping data structure and the high frequency update table. In response to an APL event, the journal data structure is flushed. As discussed, the HFUT and the mapping data structure can also be flushed. In response to power up after the APL event, the memory sub-system can perform recovery and rebuild of the mapping data structure with access to the journal data structure and the HFUT that is indexed into by the mapping data structure. Different methods and algorithms for performing such recovery and rebuild will be discussed below.

Advantages of the present disclosure include but are not limited to benefits in at least three categories, including runtime benefits, time-to-ready benefits (e.g., time to being operational again after power up), and benefits in terms of the amount of data that is to be flushed in response to an APL event. In terms of runtime benefits, journals do not need to be continuously flushed and snap shots of the mapping data structures (e.g., base tables) are not needed, as the data in the mapping data structures is not updated frequently. In terms of time-to-ready benefits, there is no scan needed to rebuild the mapping data structures, journal replay time is minimized, and error detection on writes can be performed through the data structures, including the HFUT. In terms of the amount of data to flush, it is possible to flush the entire mapping data structure that indexes into the HFUT. Furthermore, write amplification and the need for power capacitors is minimized with an overall reduction in the amount data to be flushed in response to an APL event. Other advantages will be apparent to those skilled in the art of memory allocation and APL design handling within a memory sub-system discussed hereinafter.

FIG. 1A illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such. Each memory device 130 or 140 can be one or more memory component(s).

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1A illustrates one example of a host system 120 coupled to one memory sub-system 110. As used herein, "coupled to" or "coupled with" generally refers to a connection between components or devices, which can be an indirect communicative connection or direct communicative connection (e.g., without intervening components or devices), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface, which can communicate over a system bus. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1A illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., processing device(s)) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1A has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical block address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, the memory devices 130 are managed memory devices, which is a raw memory device combined with a local controller (e.g., the local media controller 135) for memory management within the same memory device package or memory die. An example of a managed memory device is a managed NAND (MNAND) device.

In some embodiments, the controller 115 includes an error-correcting code (ECC) encoder/decoder 111. The ECC encoder/decoder 111 can perform ECC encoding for data written to the memory devices 130 and ECC decoding for data read from the memory devices 130, respectively. The ECC decoding can be performed to decode an ECC codeword to correct errors in the raw read data, and in many cases also to report the number of bit errors in the raw read data.

Figure 1B:
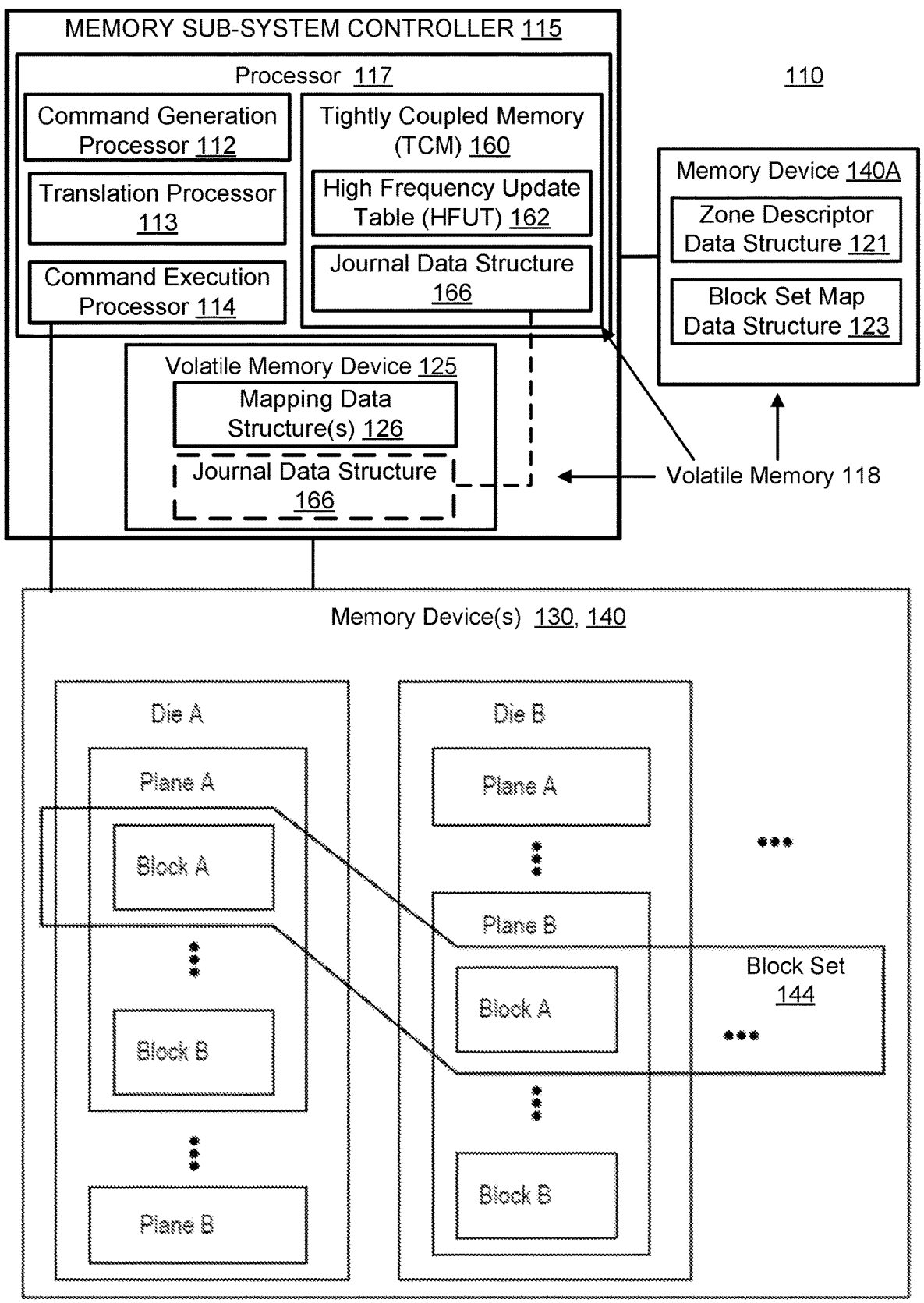
FIG. 1B illustrates the memory sub-system of FIG. 1A in additional detail according to an embodiment.

FIG. 1B illustrates the memory sub-system 110 of FIG. 1A in additional detail according to an embodiment. In embodiments, the memory sub-system 110 also includes different types of volatile memory 118 to speed up memory management and facilitate access to host data stored in the memory device(s) 130 and 140. In various embodiments, the volatile memory includes a memory device 140A, a tightly coupled memory (TCM) 160, and a volatile memory device 125. In some embodiments, the controller 115 includes, within the processor 117, multiple portions of a processing device (or multiple separate processing devices), including a command generation processor 112, a translation processor 113, and a command execution processor 114.

In various embodiments, the memory device 140A is volatile memory such as DRAM or other main memory, to store a zone descriptor data structure 121 and a block set map data structure 123, as these are usually too large to store on board the controller 115. The processor 117 can further include the TCM 160, which is volatile memory that can function as cache and is located on the die of the processor 117. The TCM 160 can store each high frequency update table (HFUT) 162 and also each journal data structure 166. The controller 115 can further include the volatile memory device 125 such as a static random access memory (SRAM) device that is a separate memory die located on the controller 115. The volatile memory device 125 can store logical-to-physical (LTP) mapping data structures, e.g., mapping data structures 126 and optionally also one or more journal data structure 166 if the latter are too big in a particular design to be stored in the TCM 160. In various embodiments, the processor 117 can determine a location of the high frequency update table 162 in the volatile memory based on an identifier stored in relation to a corresponding mapping data structure 126. Some of the mapping data structures 126, which include the block set map data structure 123, are discussed in more detail with reference to FIG. 2.

Further, as previously discussed with reference to one or more memory device(s) 130, 140, the physical address space of the multiple dies (e.g., Die A and Die B) can be hierarchically organized by plane, block, and page. So, for example, each of Die A and Die B can include Plane A and Plane B, and each of Plane A and Plane B can include Block A and Block B. A block set (or block stripe) can be defined as a group of blocks arrayed across planes of multiple dies of the memory device(s). As illustrated, a block set 144 is arrayed to include Block A of Plane A of Die A, Block A of Plane B of Die B, and so forth, e.g., also of Plane C of Die C and on to further dies, if present and online.

In various embodiments, the translation processor 113 (and/or a dynamic data placer of the controller 115 coupled to the translation processor 113) dynamically determines a media layout to place data associated with logical addresses in the media units or memory components (also referred to as "IC dies" or "media") of the memory devices 130, 140. A media layout specifies the mapping between the logical addresses used in commands received in the memory sub-system 110 (e.g., from the host system 120) and the physical memory locations in the media of the memory sub-system 110.

The translation processor 113 can determine the media layout for a portion of logical addresses of LBA space for the placement of data at the logical addresses associated with physical addresses of media of the memory device 130 or 140, e.g., based on the availability of the media to write, program, store, commit data at the time of input/output scheduling in the memory sub-system 110. When IC die(s), including media units within the IC die(s), are available for committing/programming data, a write command is scheduled for execution in the memory sub-system 110; and the translation processor 113 generates a portion of the media layout for the write command and maps the logical address (es) used in the write command to map to memory locations within the IC die(s). The execution of the write command causes the memory sub-system 110 to commit/program data associated with the write command into the IC die(s).

Depending on availability of IC dies across the media and/or application of a sequential mapping scheme, the controller 115 can either sequentially write data groups (e.g., provided in a sequential stream of data locality) to fill up one IC die at a time or can sequentially write to multiple IC dies at a time, in parallel, e.g., to concurrently fill up the IC dies of the media. The mapping of the writes within the zones of the LBA space can also be done sequentially to simplify the calculations used to perform the mapping, as will be discussed in more detail with reference to the mapping data structures 126. When there are multiple IC dies available, logical addresses (e.g., LBAs) used in the commands from multiple write streams can be mapped by the dynamically generated portion of the media layout to the multiple IC dies respectively, such that there is no media access collision in the execution of the commands from the multiple write streams.

In various embodiments, the command generation processor 112 performs command processing, to include processing memory commands received from the host system 120, and also generating read commands and write commands based on read and write requests, respectively received from the host system 120 or another requesting agent. The translation processor 113 translates an LBA (or a group of sequential LBAs referred to a logical transfer unit (LTU)) to physical addresses of the physical address space using the mapping data structures 126. Generation of this translation facilitates generation of commands by the command generation processor 112 to the command execution processor 114, which executes commands with access to the media of the memory devices 130 and 140. The commands can include a command tag also referred to as a system tag (e.g., Systag), which includes an LTU identifier (associated with the LTU) and a buffer address identifying a buffer (e.g., a slot in the memory device 140A) in which the data associated with the translation unit are stored as if in a cache. The command execution processor 114 can retrieve data associated with the command tag from the memory device 130 or 140 and store the data in the identified buffer.

In this way, the translation processor 113 acts as an intermediary between the command generation processor 112 and the command execution processor 114, where the command execution processor 114 needs to know the physical address of the physical layer to fulfill a command. In the present disclosure, metadata associated with writing to an active zone such as a write pointer and/or corresponding index information can be updated within the HFUT 162 and journaled within the journal data structure 166 to facilitate responses to APL events.

Figure 2:
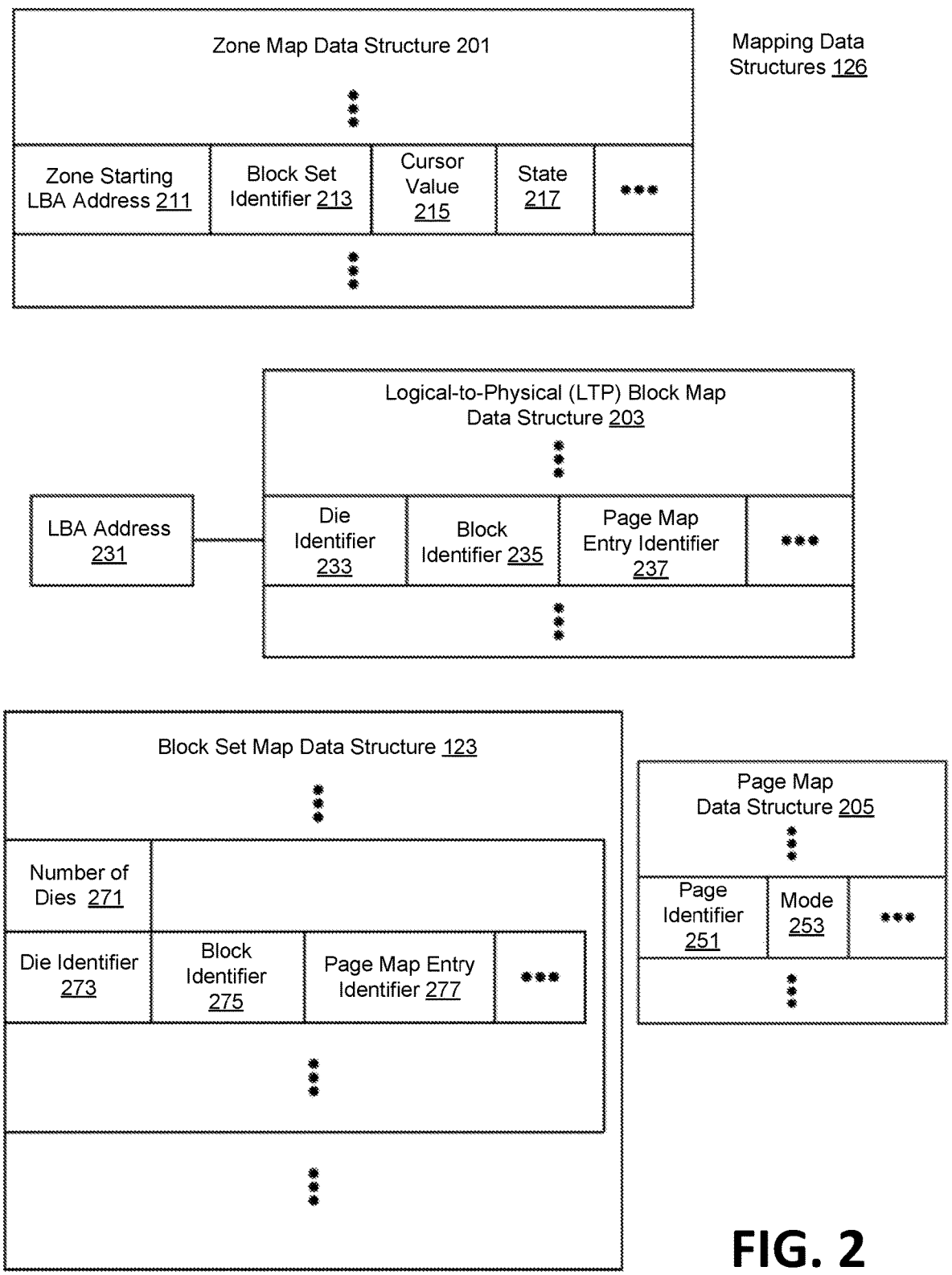
FIG. 2 is a block diagram that illustrates an example of data structures configured to support zone-based mapping according to various embodiments.

FIG. 2 is a block diagram that illustrates an example of data structures configured to support zone-based mapping according to various embodiments. The controller 115 can store some of the mapping data structures 126 illustrated in FIG. 2 in the TCM 160, in the volatile memory device 125, and/or in the memory device 140A, as mentioned with reference to FIG. IB. The controller 115 can also configure or implement the media layout (e.g., a layout of where a data group of a zone is to be located within physical address space) using the data structures of FIG. 2. In FIG. 2, a zone map data structure 201 is configured to provide media layout information for a zone in a namespace, e.g., the LBA space for ZNS operations. The zone map data structure 201 can have multiple entries. Each zone map entry in the zone map data structure 201 identifies information about a zone, such as a starting LBA address 211 of the zone, a block set identifier 213 of the zone, a zone cursor value 215 of the zone, a state 217 of the zone, and the like.

The host system 120 writes data in the zone beginning at the LBA of the zone starting LBA address 211. The host system 120 writes data in the zone sequentially in the LBA space. After an amount of data has been written into the zone, the current starting LBA address for writing subsequent data is identified by the zone cursor value 215. Each write command for the zone moves the zone cursor value 215 to a new starting LBA address for the next write command for the zone. The state 217 can have a value indicating that the zone is empty, full, implicitly open, explicitly open, closed, and the like, to track progress of writing that zone.

In FIG. 2, a logical-to-physical (LTP) block map data structure 203 is configured to facilitate the translation of LBA addresses into physical addresses in the media. The LTP block map data structure 203 can have multiple entries. An LBA can be used as, or converted into, an index (e.g., LTU identifier) for an entry in the LTP block map data structure 203. The index can be used to look up an entry for the LBA. Each entry in the LTP block map data structure 203 identifies, for an LBA, the physical address of a block of memory in the media. For example, the physical address of the block of memory in the media can include a die identifier 233, a block identifier 235, a page map entry identifier 237, a page identifier 251, and the like. A die identifier 233 identifies a specific IC die (e.g., Die A or Die B) in the memory device(s) 130, 140 of the memory sub-system 110. A block identifier 235 identifies a specific block of memory (e.g., NAND flash memory) within the IC die that is identified using the die identifier 233. A page map entry identifier 237 identifies an entry in the page map data structure 205.

The page map data structure 205 can have multiple entries. Each entry in the page map 205 can include a page identifier 251 that identifies a page of memory cells within a block of memory cells (e.g., NAND memory cells). For example, the page identifier 251 can include a word line number for the page and a sub block number for the page in the block of NAND memory cells. Further, the entry for the page can include a programming mode 253 of the page. For example, the page can be programmed in an SLC mode, an MLC mode, a TLC mode, or a QLC mode. When configured in the SLC mode, each memory cell in the page is to store one bit of data. When configured in the MLC mode, each memory cell in the page is to store two bits of data. When configured in the TLC mode, each memory cell in the page is to store three bits of data. When configured in the QLC mode, each memory cell in the page is to store four bits of data. Different pages in an integrated circuit die can have different modes for data programming.

In FIG. 2, the block set map data structure 123 stores data controlling aspects of the dynamic media layout for a zone. The block set map data structure 123, which can be a table in one embodiment, can have multiple entries. Each block set entry in the block set data structure 123 identifies a number/count 271 of integrated circuit dies (e.g., Die A and Die B) in which data of the zone is stored. For each of the integrated circuit dies used for the zone, the block set entry of the block set map data structure 123 has a die identifier 273, a block identifier 275, a page map entry identifier 277, a page map offset value, and the like.

The die identifier 273 identifies a specific IC die (e.g., Die A or Die B) in the media of the memory sub-system 110, on which IC die subsequent data of the zone can be stored. The block identifier 275 identifies a specific block of memory (e.g., NAND flash memory or other media) within the IC die that is identified using the die identifier 273, in which block the subsequent data of the zone can be stored. The page map entry identifier 277 identifies a page map entry in the page map data structure 205, which identifies a page that can be used to store the subsequent data of the zone.

For example, a memory sub-system 110 receives multiple streams of write commands. In an embodiment, each respective stream in the multiple streams is configured to write data sequentially in a logical address space in one embodiment; and in another embodiment, a stream in the multiple streams is configured to write data pseudo-sequentially, or randomly in a logical address space in one embodiment. Each write stream includes a set of commands that are tagged to write, trim, overwrite a set of data together as a group. In the group, the data can be written in a logical space sequentially, randomly, or pseudo-sequentially. Preferably, the data in the group is written into an erase block set, where memory cells in the erase block set store data for the stream but not data from other streams. The erase block set can be erased to remove the data of the stream without erasing the data of other streams.

For example, each of write streams is permitted to sequentially write at LBAs in a zone in a namespace allocated in the media of the memory device(s) 130, 140 of the memory sub-system 110, but prohibited from writing data out of sequence in the LBA (or logical address) space. The translation processor 113 of the memory sub-system 110 identifies multiple media units in the memory sub-system 110 that are available to write data concurrently.

The translation processor 113 can select first commands from the multiple streams for concurrent execution in the multiple media units that are available to write data. The translation processor 113 can generate and store, dynamically in response to the first commands being selected for concurrent execution in the multiple media units, a portion of a media layout that maps from logical addresses identified by the first commands in the logical address space to physical addresses of memory units in the multiple memory units.

The command execution processor 124 can execute the first commands concurrently by storing data into the memory units according to the physical addresses. For example, at the time of scheduling the first commands for execution, execution of second commands can be in progress in a subset of memory units of the media of the memory sub-system 110. Thus, the subset of memory units used for the execution of the second commands are not available for the first commands. After the first commands are scheduled and the portion of the media layout for the logical addresses used in the first commands is determined, the first commands can be executed in the multiple media units concurrently and/or concurrently with the progress of the execution of the second commands in remaining media units of the memory sub-system 110.

For example, after the identification of the multiple memory units (e.g., IC dies) that are available for the execution of next commands, the translation processor 113 can identify, from the block set map data structure 123, the physical addresses that can be used to store data of the next commands. The physical addresses can be used to update the corresponding entries in the LTP block map data structure 203 for the LBA addresses 231 used in the next commands.

For example, when an IC die is free to write data, the translation processor 113 can determine a command of a zone that can be written/programmed into the memory cells in the IC die. From the block set map data structure 123, the translation processor 113 locates an entry for the zone, locates the block identifier 275 and the page map entry identifier 277 associated with the identifier 273 of the integrated circuit die, and uses the die identifier 273, the block identifier 275, and the page map entry identifier 277 to update the corresponding fields of the entry in the LTP block map data structure 203 for the LBA used in the command of the zone.

Figure 3:
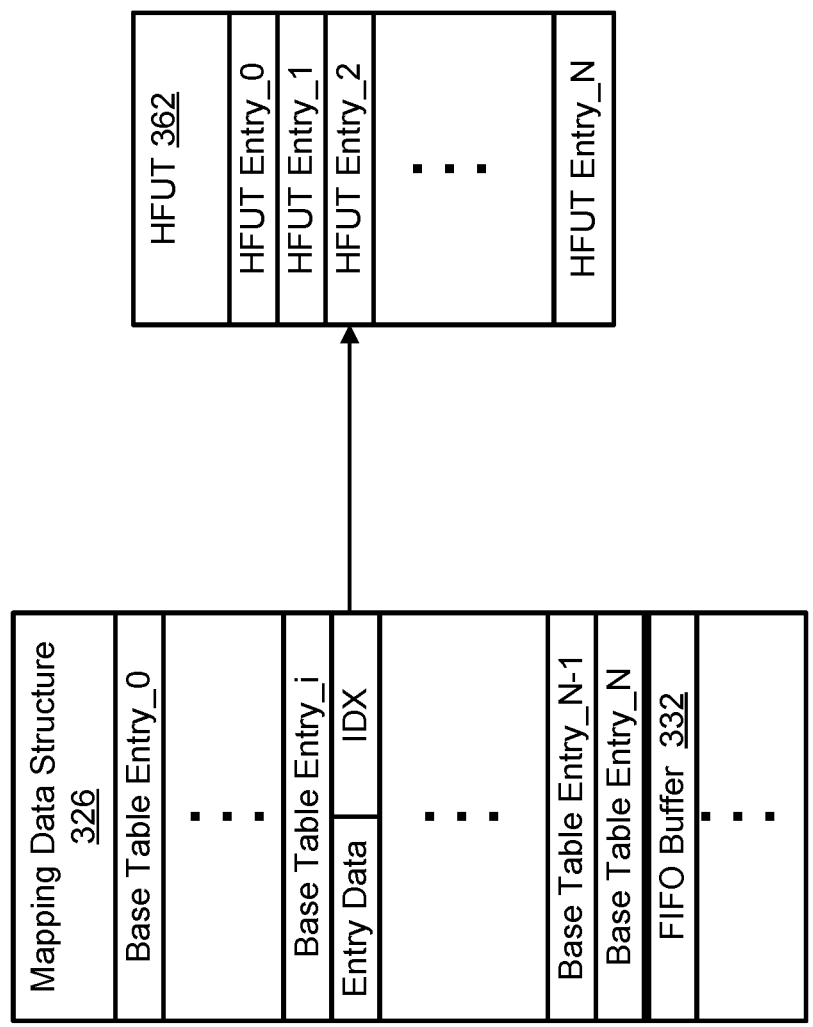
FIG. 3 is a block diagram of a mapping data structure that indexes within a high frequency update table (HFUT) according to an embodiment.

FIG. 3 is a block diagram of a mapping data structure 326 that indexes within a high frequency update table (HFUT) 362 according to an embodiment. The mapping data structure 326, e.g., a base table, can be one of the mapping data structures 126 and the HFUT 362 can be one of the HFUTs 162 in FIG. 1B. In various embodiments, the mapping data structure 326 includes a number of entries, each entry including entry data associated with some aspect of a logical-to-physical translation between an LBA (or LTU) and a physical address of the physical address space of the NVM device. Each entry can also include an index value (IDX) that points into an indexed entry in the HFUT 362, such that the metadata within the HFUT entry is associated with the entry of the mapping data structure 326. The index value can be a hash-based value, for example. In some embodiments, the mapping data structure includes a first-in-first-out (FIFO) buffer 332 to maintain which table index values are free for assignment to the HFUT 362.

In various embodiments, the HFUT 362 is designed to store (e.g., buffer) frequently updated data such as the write pointer (WP) for active zones mapped to a smaller area that can be flushed during an APL event that causes power failure. For example, to maintain 2048 open cursor values at 4 bytes per entry, the HFUT 362 would be a size of 8K worth of metadata. This is much smaller than including the write pointer metadata into a single large table such as the mapping data structure 326. Calculations show a memory savings of almost half of a size of the mapping data structure 326, e.g., which could be the zone map data structure 201 or of a zone-to-block set data structure (409 in FIG. 4). This can be achieved because items such as the write pointer or last written page (LWP) are not updated once a zone or block set is closed. In other words, the values of metadata that are static need not be updated within the HFUT 362, making it a much smaller table. As one example, in a system that has 30K zones in a 16 terabyte drive, the memory savings is significant. Only about seven percent of this drive is actively being written at any time.

To prevent scanning except in extraordinary recovery efforts after an APL event, journal data structures are used to log flush transitions between the mapping data structure 326 and the HFUT 362, which will be discussed in more detail with reference to FIG. 4. This is done by assigning the index value (IDX) to the entry in the mapping data structure 326, so that a journal entry can also index against the metadata in the entry of the HFUT 362. The minor performance hit for performing this indexing is small compared to the benefits of logging and journaling much less data related to active zones.

Figure 4:
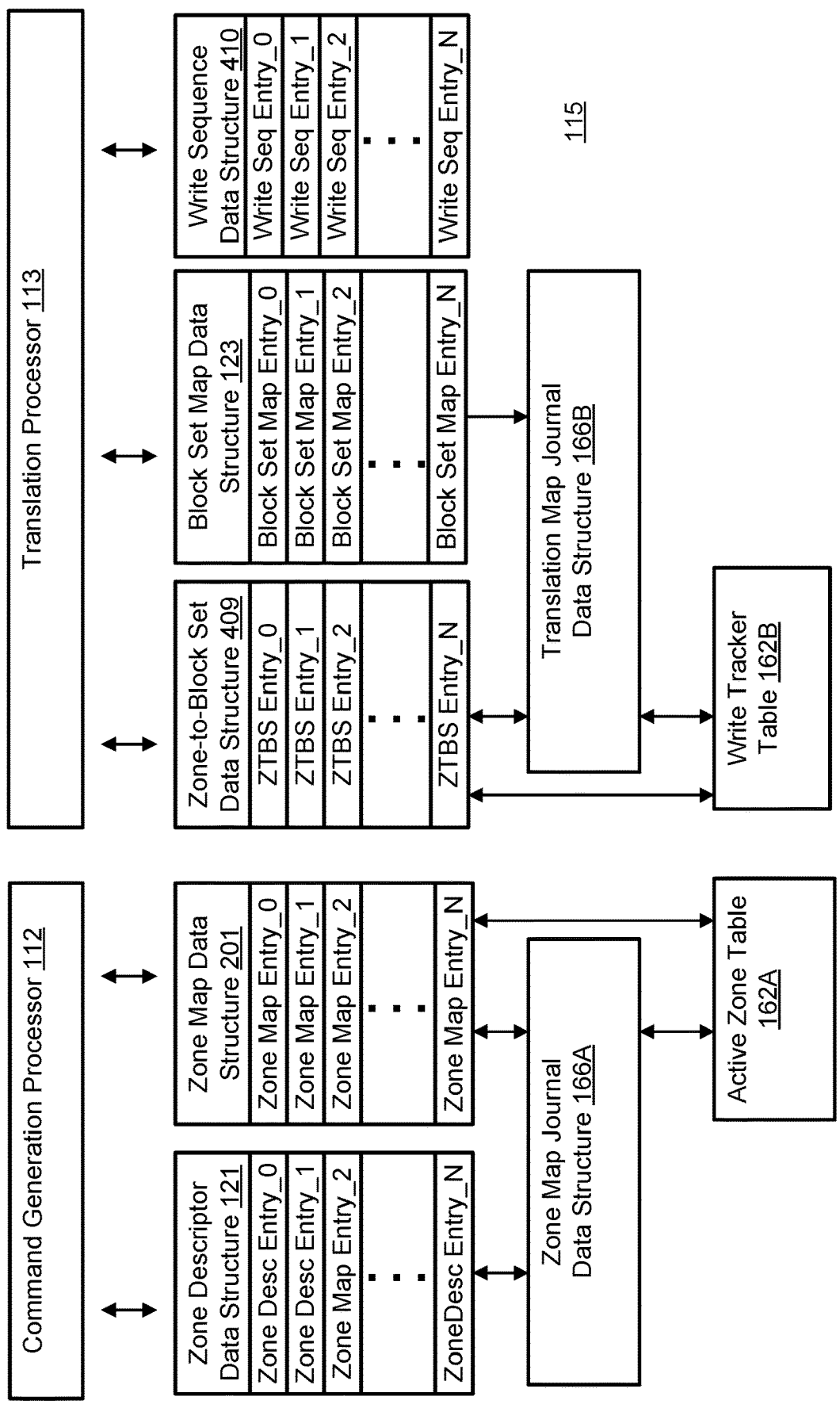
FIG. 4 is a block diagram of mapping data structures that employ a journal and a high frequency update table to reduce a size of the mapping data structures and allows flush in response to asynchronous power loss (APL) according to various embodiments.

FIG. 4 is a block diagram of the mapping data structures 126 that employ a journal and a high frequency update table to reduce a size of the mapping data structures 126 and allows flush in response to asynchronous power loss (APL) according to various embodiments. The mapping data structures 126, for example, can include the zone descriptor data structure 121 and the zone map data structure 201, which are managed by the command generation processor 112. A zone map journal data structure 166A can journal entries based on updates to the zone descriptor data structure 121 and based on flush transitions between the zone map data structure 201 and an active zone table 162A, which is a high frequency update table (HFUT) associated with the zone map data structure 201. The processor 117 can determine a location of the high frequency update table 162, e.g., the active zone table 162A, in the TCM 160 based on an identifier stored in relation to the zone map data structure 201 in the volatile memory device 125. In one embodiment, the zone map journal data structure 201 is only flushed in response to an APL event. A flush can occur during, and thus in response to, an APL event by writing data preserved using power capacitors to a non-volatile memory (NVM) device of the memory device 130 and 140.

In one embodiment, the zone descriptor data structure 121 is a flat indexed mapping table that is hashed by zone ID (e.g., a hash value of the zone ID), where the zone ID is a value much larger than an LTU identifier. The zone ID can be calculated from the LTU identifier and a zone size value, e.g., by dividing a value for the LTU identifier by the zone size value. The term "flat" is with reference to a hash-indexed table that is two-dimensional, e.g., a tree or a linked list. The zone descriptor data structure 121 can store the zone descriptor data sent to the controller 115 by the host system 120.

In one embodiment, the zone map data structure 201 is a flat indexed mapping table that is indexed by a hashed zone ID, e.g., a value much larger than a value of the LTU identifier. Each entry in the zone map data structure 201 can contain metadata including a zone state and a zone index within the LBA space, which in one embodiment, includes a zone write pointer submission value and a zone write pointer completion value. These values can be written at the same time and upon completion of writing to the zone identified by the zone ID. The zone map data structure 201 can be sufficiently small, particularly with use of the active zone table 162A, to be flushed during an APL event as the data of the zone map data structure 201 changes infrequently.

In various embodiments, the active zone table 162A stores the zone write pointer submission value and the zone write pointer completion value for an open zone. The zone map journal data structure 166A can, therefore, record (e.g., journal) flush transitions in these values between the zone map data structure 201 and the active zone table 162A. In this way, each write is updated in the active zone table 162A for a zone in the active state. Upon an APL event, the active zone table 162A is flushed and therefore its information (on a current write operation) need not be journaled in the zone map journal data structure 166A until the write operation has completed. This design allows for a manageable size journal such that the zone map journal data structure 166A can be flushed only at power fail instead of continuously flushed.

In some embodiments, upon completion of writing to the zone, the controller 115 can further populate the entry of the zone map data structure 201 with a mapping between a zone identifier and the zone index for the write request to the zone. The controller 115 can further deactivate, in the zone map data structure 201, the zone to indicate the zone is closed.

The controller 115 can further perform recovery and a rebuild after reboot, to include reading the journal data structure (e.g., the zone map journal 166A) from the NVM device back into the volatile memory, e.g., the TCM 160. The controller 115 can further read the high frequency update table (e.g., the active zone table 162A) from the NVM device back into the volatile memory, e.g., the TCM 160. The controller 115 can further update the entry of the zone map data structure 201 based on the metadata in the journal data structure and a last recorded zone write pointer in the high frequency update table.

A smalltime to replay entries in the zone map journal data structure 166A can be controlled via a version or timestamp. To replay the entries means to read the entries back into the volatile memory, e.g., in the TCM 160 in this embodiment. These updates can also occur to snapshots of the zone descriptor data structure 121, e.g., can update the zone map journal data structure 166A with a zone descriptor stored in the zone descriptor data structure 121. The active zone table 162A can therefore be restored from the NVM device to the volatile memory with accurate values as of the time the APL event occurred. The zone map journal data structure 166A can check for errors that require a repair operation by merely walking through each HFUT entry (of the active zone table 162A) and comparing the submission and completion pointer values.

Thus, in one embodiment, the controller 115 can identify errors in the zone map data structure 201 during a rebuild after reboot, to include reading the active zone table 162A from the NVM device back into the volatile memory. The controller 115 can further compare the zone write pointer submission value in the entry of the zone map data structure 201 with corresponding values in entries of the active zone table 162A and compare the zone write pointer completion value in the entry of the zone map data structure 201 with corresponding values in entries of the active zone table 162A. Any errors can be repaired with reference to the active zone table 162A, and if an error still occurs, the controller 115 can initiate a full scan.

The mapping data structures 126 can further include a zone-to-block set (ZBTS) data structure 409, the block set map data structure 123, and a write sequence data structure 410, which are managed by the command execution processor 113. A translation map journal data structure 166B can journal entries based on updates to the block set map data structure 123 and based on flush transitions between the ZTBS data structure 409 and a write tracker table 162B, which is a high frequency update table (HFUT) associated with the ZTBS data structure 409. The Z2BT data structure 409 can be sufficiently small, particularly with use of the write tracker table 162B, to be flushed during an APL event, but ability to flushed using power capacitors is design specific depending on write granularity.

In one embodiment, the block set map data structure 123 is a flat indexed mapping table that is indexed by block set ID (e.g., block stripe ID). The block set map data structure 123 can map from the block set ID to physical blocks (e.g., physical block addresses or identifiers) within each die of the media. In one embodiment, the ZTBS data structure 409 is a flat indexed mapping table that is indexed by a hashed zone ID value, e.g., a value much larger than a value of the LTU identifier. The translation processor 113, in an embodiment, manages the ZTBS data structure 201. The ZTBS data structure 409 can map the zone ID to a block set identifier (ID) (e.g., block stripe number) that identifies a block set where the data resides.

In one embodiment, the write sequence data structure 210 is a flat indexed mapping table that is indexed by a hashed LTU identifier or LBA value. The write sequence data structure 210 can track a location of writing to physical addresses of the memory device 130 and 140 to ensure writing to the physical addresses in sequential order per ZNS protocol.

In various embodiments, the write tracker table 162B stores the last written page (LWP) in the NVM device and can be flushed only in response to an APL event. The translation map journal data structure 166B can, therefore, record (e.g., journal) flush transitions in these LWP values between the ZTBS data structure 409 and the write tracker table 162B. In this way, each write is updated in the write tracker table 162B for a zone in the active state. Upon an APL event, the write tracker table 162B is flushed and therefore its information (on a current write operation) need not be journaled in the translation map journal data structure 166B until the write operation has completed. This design allows for a manageable size journal such that the journal map journal data structure 166B can be flushed only at power fail instead of continuously flushed.

In some embodiments, upon completion of writing to the zone, the controller 115 can further populate the entry of the mapping data structure (e.g., the ZTBS data structure 409) with a mapping between the corresponding LBA space and the corresponding physical address space for the write request to the active zone. The controller can further deactivate, in the mapping data structure, the active zone to close the active zone.

The controller 115 can further perform recovery and a rebuild after reboot, to include reading the journal data structure (e.g., the translation map journal data structure 166B) from the NVM device back into the volatile memory, e.g., the TCM 160. The controller 115 can further read the high frequency update table (e.g., the write tracker table 162B) from the NVM device back into the volatile memory, e.g., the TCM 160. The controller 115 can further update the entry of the mapping data structure based on the metadata in the journal data structure and a last recorded write pointer in the high frequency update table.

A smalltime to replay entries in the translation map journal data structure 166B can be controlled via a version or timestamp. To replay the entries means to read the entries back into the volatile memory, e.g., in the TCM 160 in this embodiment. These updates can also occur to snapshots of the block set map data structure 123, e.g., can update the translation map journal data structure 166B with updates to the block set map data structure 123. The write tracker table 162B can therefore be restored from the NVM device to the volatile memory with accurate values as of the time the APL event occurred. The translation map journal data structure 166B can check for errors that require a repair operation by merely walking through each HFUT entry (of the write tracker table 162B) and ensuring that the LWP values are in an expected order as dictated by the write sequence data structure 410.

Accordingly, in one embodiment, the controller 115 can perform a recovery and rebuild after power up after an APL event by first reading the write tracker table 162B from the NVM device back into the volatile memory. The controller 115 can further read the ZTBS data structure 409 and the write sequence data structure 410 from the NVM device back into the volatile memory. The controller 115 can further determine whether the LWP values contained in the write tracker table 162B are in an order as ordered in the write sequence data structure 410. The controller 115 can further update the ZTBS data structure responsive to a detected error in the order of the LWP values.

FIG. 5 is a flow chart of a method 500 for efficiently handling APL within a memory sub-system that programs sequentially according to an embodiment. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the controller 115 (e.g., the processor 117) of FIGS. 1A-1B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

The processing logic can stores, within a volatile memory communicatively coupled to a non-volatile memory (NVM) device, a mapping data structure that maps each zone of a logical block address (LBA) space to a corresponding physical address space of the NVM device. Each zone can include corresponding multiple sequential LBAs that are mapped to multiple sequential physical addresses. The processing logic can also store, in the volatile memory, a journal data structure and a high frequency update table (HFUT). The volatile memory can be a combination of the TCM 160 and the volatile memory device 125, as discussed with reference to FIG. 1B. The journal data structure can be one of the zone map journal data structure 166A, the translation map journal data structure 166B, or some other journal device. The HFUT can be one of the active zone table 162A, the write tracker table 162B, or some other HFUT structure.

At operation 520, the processing logic writes, responsive to a write request, to an active zone of the LBA space, the active zone being mapped, within a mapping data structure, to a corresponding physical address space of a non-volatile memory (NVM) device. As discussed, the command generation processor 112 can generate a command that includes a command tag having a physical address to which the command execution processor 114 will begin writing. This physical address will be associated with a write pointer that can be tracked as the active zone is sequentially written.

At operation 530, the processing logic writes, within an entry of a high frequency update table stored in a volatile memory, a value of a write pointer for a location in the NVM device corresponding to writing within the active zone. If the write pointer is to be stored in the active zone table 162A, the write pointer can be a zone write pointer associated with the LBA space. If the write pointer is to be stored in the write tracker table 162B, the write pointer can be a physical write pointer that points to the physical address space of the NVM device.

At operation 540, the processing logic writes, within an entry of the mapping data structure, a table index value that points to the entry of the high frequency update table. The way this indexing is implemented is discussed with reference to FIG. 3, and enables the journal data structure to track flush transitions between the mapping data structure and the HFUT.

At operation 550, the processing logic updates, within a journal data structure stored in the volatile memory, metadata of the entry of at least one of the mapping data structure or the high frequency update table affected by a flush transition between the mapping data structure and the high frequency update table. Such a flush transition can occur after completion of a write operation, and therefore, the journaling of a write pointer need not occur until such a write completion has been completed.

At operation 560, in response to an asynchronous power loss (APL) event, the processing logic flushes the journal data structure and the high frequency update table to the NVM device. In one embodiment, the processing logic can also flush the mapping data structure to the NVM device. Because these data structures and HFUT have been flushed, they can be replayed upon reboot of the memory device and used in performing recovery and rebuild of the mapping data structure as was discussed with reference to FIG. 4 and will be discussed in more detail with reference to FIG. 7 and FIG. 8.

FIG. 6 is a flow chart of a method 600 for efficiently handling APL within a memory sub-system that programs sequentially according to another embodiment. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the controller 115 (e.g., the processor 117) of FIGS. 1A-1B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

The processing logic can store, within a volatile memory communicatively coupled to a non-volatile memory (NVM) device, a zone map data structure 201 that maps a zone of a logical block address (LBA) space to a zone state and to a zone index within the LBA space. The zone can be multiple sequential LBAs that are mapped to multiple sequential physical addresses, for example. The processing logic can also store, in the volatile memory, a journal data structure and a high frequency update table. The volatile memory can be a combination of the TCM 160 and the volatile memory device 125, as discussed with reference to FIG. 1B. The journal data structure can be one of the zone map journal data structure 166A or some other journal device. The HFUT can be one of the active zone table 162A or some other HFUT structure.

With reference to FIG. 6, at operation 620, the processing logic writes, responsive to a write request, to an active zone of the LBA space, the active zone being mapped, within the zone map data structure 201, to a zone state and to a zone index within the LBA space. The active zone may include multiple sequential LBAs that are mapped to multiple sequential physical addresses of a non-volatile memory (NVM) device. As discussed, the command generation processor 112 can generate a command that includes a command tag having a physical address to which the command execution processor 114 will begin writing. This physical address can be associated with a write pointer that can be tracked as the active zone is sequentially written.

At operation 630, the processing logic writes, within an entry of a high frequency update table stored in a volatile memory, a value of a zone write pointer corresponding to the zone index, where the zone write pointer is for a location in the LBA space where the processing device is writing to the zone in service of a write request. If the write pointer is to be stored in the active zone table 162A, the write pointer can be a zone write pointer that points to allocation within the LBA space.

At operation 640, the processing logic writes, within an entry of the zone map data structure 201, a table index value that points to the entry of the high frequency update table (HFUT). In one embodiment, the HFUT is the active zone table 162A. The way this indexing is implemented is discussed with reference to FIG. 3, and enables the zone map journal data structure 166A to track flush transitions between the zone map data structure 201 and the active zone table 162A.

At operation 650, the processing logic updates, within a journal data structure stored in the volatile memory, metadata of the entry of at least one of the zone map data structure 201 or the journal data structure affected by a flush transition between the zone map data structure 201 and the high frequency update table. Such a flush transition can occur after completion of a write operation, and therefore, the journaling of a write pointer (or corresponding information) need not occur until such a write completion has been completed.

At operation 660, the processing logic, in response to an asynchronous power loss (APL) event, flushes the journal data structure and the high frequency update table to the NVM device. In one embodiment, the processing logic can also flush the zone map data structure 201 to the NVM device. Because these data structures and HFUT have been flushed, they can be replayed upon reboot of the memory device and used in performing recovery and rebuild of the mapping data structure as was discussed with reference to FIG. 4 and will be discussed in more detail with reference to FIG. 7 and FIG. 8.

Figure 7:
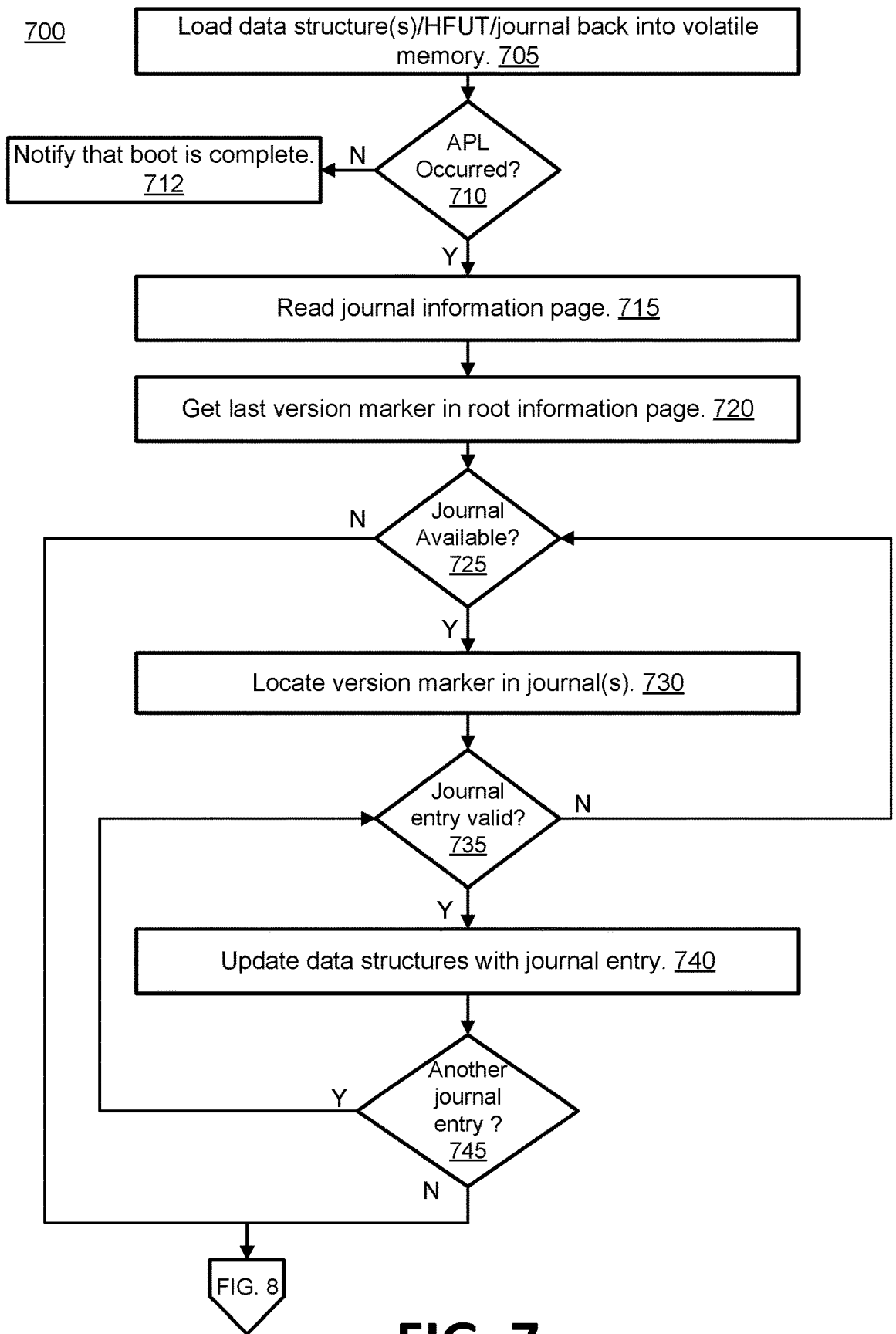
FIG. 7 is a flow chart of a method for recovery of mapping data structures after reboot from an APL according to an embodiment.

FIG. 7 is a flow chart of a method for recovery of mapping data structures after reboot from an APL according to an embodiment. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by the controller 115 (e.g., the processor 117) of FIGS. 1A-1B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

With reference to FIG. 7, at operation 705, the processing logic loads the mapping data structure(s) 126, the HFUT 162, and the journal data structure 166 from the NVM device back into the volatile memory. The volatile memory can be a combination of the TCM 160 and the volatile memory device 125, as discussed with reference to FIG. 1B. The journal data structure can be one of the zone map journal data structure 166A, the translation map journal data structure 166B, or some other journal device. The HFUT can be one of the active zone table 162A, the write tracker table 162B, or some other HFUT structure.

At operation 710, the processing logic determines whether an APL event occurred, and thus, the memory sub-system 110 is powering up (e.g. boot) after the APL event. If no, at operation 712, the processing logic notifies the command generation processor 112 that the boot is complete. If the answer is no, at operation 715, the processing logic reads a journal information page associated with the journal data structure 166, e.g., pertaining to the last written entries.

At operation 720, the processing logic retrieves a last version marker in a root information page (RIP). Version markers are forward moving counters that allow the controller 115 to sequence events. A version marker with a later value (accounting for roll-over) means the marked event happened later, similar to a time stamp. The difference in time is continuously rolling, but version markers may only be updated at critical points, e.g., when a migration is completed, which allow the controller 115 to determine that before a certain version marker, replay is unnecessary.

With continued reference to FIG. 7, at operation 725, the processing logic determines whether the journal data structure 166 is available. If no, the processing logic skips to verification of data structures as discussed with reference to FIG. 8. If yes, at operation 730, the processing logic locates a version marker in the journal data structure 166. At operation 735, the processing logic can determine whether the journal entry (marked with the version marker) is valid. If no, the processing logic loops back to operation 725. If yes, at operation 740, the processing logic updates the data structures with the journal entry. These data structures can include the mapping data structure 126 and the HFUT 162, for example.

At operation 745, the processing logic determines whether there is another journal entry in a journal data structure that is marked with the last version marker. If yes, the processing logic loops back to operation 735 to continue checking on journal entry validity and updating, at operation 740, the data structures with any valid journal entry. If no, there are no more such journal entries, the processing logic moves on to the verification of the data structures as discussed with reference to FIG. 8.

FIG. 8 is a flow chart of a method 800 for verification of the recovered mapping data structures after reboot from an APL according to an embodiment. The method 800 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 800 is performed by the controller 115 (e.g., the processor 117) of FIGS. 1A-1B. The verification of recovered mapping data may allow verification that data was properly recovered and thus can function as a test, not a prerequisite for the computing system to function. At various levels, method 800 can compare the contents of the active zone table 162A (which has a state) to the zone map data structure 201. Further checks can be made that the index of the active zone table 162A points to the correct zone ID or LBA identifier. The method 800 may also verify that there are no duplicate entries for the index and other such checks, as will be discussed in more detail.

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

With reference to FIG. 8, before initiation of the depicted flow (not shown), there can first be a check to determine whether to skip all data comparisons, and thus the verification generally. If directed so, the processing logic may skip down to operation 870 and boot complete. This may allow a quicker boot cycle where there may not be a concern about data verification. Otherwise, assuming verification proceeds, at operation 802, the processing logic compares each completion write pointer (CWP) value and each submission write pointer (SWP) value in the zone map data structure 201 with corresponding values of entries in the active zone table 162A. At operation 810, the processing logic determines whether the active zone table 162A is verified based on the comparison. If not verified, at operation 805, the processing logic conducts minor repairs and, if necessary, scans active zones to correct the active zone table 162A.

If the active zone table 162A is verified, at operation 815, the processing logic verifies zone states and the index value (IDX) of the active zone table 162A. At operation 820, the processing logic determines whether the zone map data structures 201 is verified based on verification of the zone states and the index values. If not verified, at operation 805, the processing logic conducts minor repairs and, if necessary, scans active zones to correct the zone map data structure 201. Minor repairs can be to fix holes or inconsistent data. Performing a scan of active zones could take a long time, but can be performed as a final measure to rebuild the data structures and tables.

If the zone map data structure 201 is verified, at operation 825, the processing logic compares values of write pointers in the write tracker table 162B with values of write pointers in the active zone table 162A. This comparison can be performed in order to identify any incorrect locations of the write pointers. A write pointer can be incorrect due to an incomplete write operation or where the active zone table 162A has a CWP value that does not match the value of the pointer in the write tracker table 162B. At operation 830, the processing logic determines whether the write tracker table 162B is verified based on this comparison. If not verified, at operation 805, the processing logic conducts minor repairs and, if necessary, scans active zones to correct the write tracker table 162B.

If the write tracker table 162B is verified, at operation 835, the processing logic verifies counts in pools of blocks, e.g., the block sets of a zone. Maintenance of block sets can occur in pools based on their state. This is verification that a state of a block set matches a pool in which the block set resides. The pool allows for quick access to block sets in certain states for purposes such as garbage collection, wear leveling, and the like. Depending on what occurred during the APL, some of the block sets may need to be moved between different pools, for example, from the writing pool to a written pool. At operation 840, the processing logic determines whether the block set information is verified. If not verified, at operation 805, the processing logic conducts minor repairs and, if necessary, scans active zones to correct the block set information.

If the block set information is verified, at operation 845, the processing logic verifies the block set identifier (ID) and the index value (IDX) of the ZTBS data structure 409 matches the block set information and the index of the active zone table 162A, respectively. At operation 850, the processing logic determines whether the ZTBS data structure 409 is verified. If not verified, at operation 805, the processing logic conducts minor repairs and, if necessary, scans active zones to correct the ZTBS data structure 409.

If the ZTBS data structure 409 is verified, at operation 855, the processing logic checks blocks are valid and whether any errors are detected in the block set map data structure 123. For example, that no holes or defective blocks are still mapped. This can be a block set map that can be scanned looking for blocks that were added to a defect list or whether there was a hole created by a defective block, then the block set map scan would check for such incorrect mappings.

At operation 860, the processing logic determines whether the block set map data structure 123 is verified. If not verified, at operation 805, the processing logic conducts minor repairs and, if necessary, scans active zones to correct the block set data structure 123. If the block set data structure 123 is verified, at operation 870, the processing logic notifies the command generation processor 112 that boot has completed.

Figure 9:
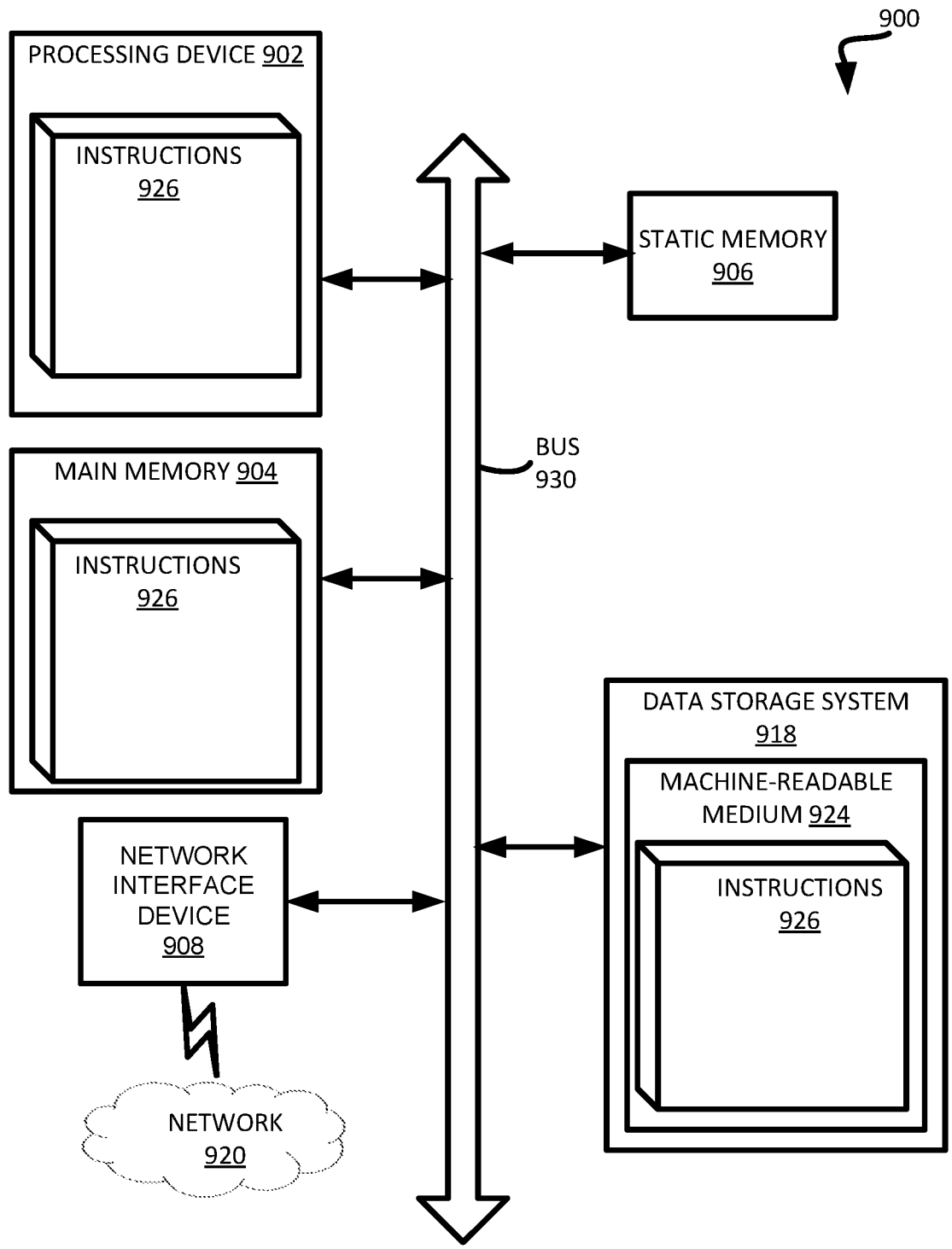
FIG. 9 is a block diagram of an example computer system in which embodiments of the present disclosure can operate.

FIG. 9 illustrates an example machine of a computer system 900 within which a set of instructions, for causing the machine to perform any one or more of the methodologies discussed herein, can be executed. In some embodiments, the computer system 900 can correspond to a host system (e.g., the host system 120 of FIG. 1A) that includes, is coupled to, or utilizes a memory sub-system (e.g., the memory sub-system 110 of FIG. 1A). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a data storage system 918, which communicate with each other via a bus 930.

Processing device 902 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 can also be one or more special-purpose processing devices such as an application specific integrated circuit (ASIC), a field programmable gate array (FPGA), a digital signal processor (DSP), network processor, or the like. The processing device 902 is configured to execute instructions 926 for performing the operations and steps discussed herein. The computer system 900 can further include a network interface device 908 to communicate over the network 920.

The data storage system 918 can include a machine-readable storage medium 924 (also known as a non-transitory computer-readable medium) on which is stored one or more sets of instructions 926 or software embodying any one or more of the methodologies or functions described herein. The instructions 926 can also reside, completely or at least partially, within the main memory 904 and/or within the processing device 902 during execution thereof by the computer system 900, the main memory 904 and the processing device 902 also constituting machine-readable storage media. The machine-readable storage medium 924, data storage system 918, and/or main memory 904 can correspond to the memory sub-system 110 of FIGS. 1A-1B.

In one embodiment, the instructions 926 include instructions to implement functionality executable by the processor 117 of FIG. 1B. While the machine-readable storage medium 924 is shown in an example embodiment to be a single medium, the term "non-transitory machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   a non-volatile memory (NVM) device;
   a volatile memory coupled to the NVM device, the volatile memory to store:
      a zone map data structure that maps a zone of a logical block address (LBA) space to a zone index within the LBA space; and
      a high frequency update table; and
   a processing device coupled to the volatile memory and the NVM device, wherein the processing device is to:
      write, within an entry of the high frequency update table, a value of a zone write pointer corresponding to the zone index for an active zone, wherein the zone write pointer comprises a location in the LBA space of the active zone;
      write, within an entry of the zone map data structure, a table index value that points to the entry of the high frequency update table; and
      journal metadata of the entry of at least one of the zone map data structure or the high frequency update table affected by a flush transition between the zone map data structure and the high frequency update table.

2. The system of claim 1, wherein, in response to an asynchronous power loss (APL) event, the processing device is further to flush the zone map data structure and the high frequency update table to the NVM device.

3. The system of claim 1, wherein the zone map data structure is stored a static random access memory (SRAM) device and the high frequency update table are stored in a tightly coupled memory (TCM), and wherein the processing device is further to determine a location of the high frequency update table in the TCM based on an identifier stored in relation to the zone map data structure in the volatile memory.

4. The system of claim 1, wherein, upon completion of writing to the zone, the processing device is further to:
   populate the entry of the zone map data structure with a mapping between a zone identifier and the zone index for a write request to the zone; and
   deactivate, in the zone map data structure, the zone to indicate the zone is closed.

5. The system of claim 1, wherein, to journal the metadata, the processing device is further to journal the metadata in a journal data structure of the volatile memory, and the processing device is further to perform a recovery and a rebuild after reboot, which comprises to:
   read the journal data structure from the NVM device back into the volatile memory;
   read the high frequency update table from the NVM device back into the volatile memory; and
   update the entry of the zone map data structure based on the metadata in the journal data structure and a last recorded zone write pointer in the high frequency update table.

6. The system of claim 1, wherein the zone map data structure maps a zone identifier to a zone state, to a zone write pointer submission value, and to a zone write pointer completion value, and wherein the high frequency update table is an active zone table that stores, in the entry of the active zone table, the zone write pointer submission value and the zone write pointer completion value for the zone write pointer.

7. The system of claim 6, wherein the processing device is further to identify errors in the zone map data structure during a rebuild after reboot, which comprises to:
   read the active zone table from the NVM device back into the volatile memory;
   read the zone map data structure from the NVM device back into the volatile memory;
   compare the zone write pointer submission value in the entry of the zone map data structure with corresponding values in entries of the active zone table; and
   compare the zone write pointer completion value in the entry of the zone map data structure with corresponding values in entries of the active zone table.

8. The system of claim 6, wherein, to journal the metadata, the processing device is further to journal the metadata in a journal data structure, the volatile memory is further to store a zone descriptor data structure, and wherein the processing device is further to update the journal data structure with a zone descriptor stored in the zone descriptor data structure.

9. The system of claim 1, wherein the processing device further comprises a first-in-first-out (FIFO) buffer to maintain which table index values are free for assignment to the high frequency update table.

10. A method comprising:
   writing, by a processing device, to an active zone of a logical block address (LBA) space, the active zone being mapped, within a mapping data structure, to a corresponding physical address space of a non-volatile memory (NVM) device;
   writing, by the processing device, within an entry of a high frequency update table stored in a volatile memory, a value of a write pointer comprising a location in the NVM device corresponding to writing within the active zone;
   writing, by the processing device, within an entry of the mapping data structure, a table index value that points to the entry of the high frequency update table; and
   journaling, by the processing device, metadata of the entry of at least one of the mapping data structure or the high frequency update table affected by a flush transition between the mapping data structure and the high frequency update table.

11. The method of claim 10, wherein, in response to an asynchronous power loss (APL) event, the method further comprising flushing the mapping data structure and the high frequency update table to the NVM device.

12. The method of claim 10, further comprising determining a location of the high frequency update table in the volatile memory based on an identifier stored in relation to the mapping data structure.

13. The method of claim 10, wherein, upon completion of writing to the active zone, further comprising:
   populating the entry of the mapping data structure with a mapping between a corresponding LBA space and the corresponding physical address space of a write request to the active zone; and
   deactivating, in the mapping data structure, the active zone to close the active zone.

14. The method of claim 10, wherein journaling the metadata comprises journaling the metadata in a journal data structure of the volatile memory, the method further comprising performing a recovery and a rebuild after reboot, to include:
   reading the journal data structure from the NVM device back into the volatile memory;
   reading the high frequency update table from the NVM device back into the volatile memory; and
   updating the entry of the mapping data structure based on the metadata in the journal data structure and a last recorded write pointer in the high frequency update table.

15. The method of claim 10, wherein the mapping data structure is a zone-to-block-set (ZTBS) data structure that maps a zone identifier to a block set identifier, and wherein the high frequency update table is a write tracker table, the method further comprising storing, in the write tracker table, a last written page (LWP) value of the NVM device corresponding to the write pointer.

16. The method of claim 15, further comprising:
   storing, in the volatile memory, a write sequence data structure that tracks a location of writing to physical addresses of the NVM device; and
   performing a recovery and a rebuild by:
      reading the write tracker table from the NVM device back into the volatile memory;
      reading the ZTBS data structure and the write sequence data structure from the NVM device back into the volatile memory;
      determining whether LWP values contained in the write tracker table are in an order as ordered in the write sequence data structure; and
      updating the ZTBS data structure responsive to a detected error in the order of the LWP values.

17. The method of claim 15, further comprising:
   storing, in the volatile memory, a block set map data structure that maps a block set identifier to block identifiers of physical blocks within the corresponding physical address space; and
   journaling updates to the block set map data structure.

18. The method of claim 10, further comprising employing a first-in-first-out (FIFO) buffer to maintain which table index values are free for assignment to entries of the high frequency update table.

19. A non-transitory computer-readable medium storing instructions, which when executed by a processing device of a memory sub-system controller, cause the processing device to perform a plurality of operations comprising:
   writing, to an active zone of a logical block address (LBA) space, the active zone being mapped, within a zone map data structure, to a zone index within the LBA space, wherein the active zone comprises sequential LBAs that are mapped to sequential physical addresses of a non-volatile memory (NVM) device;
   writing, within an entry of a high frequency update table stored in a volatile memory, a value of a zone write pointer corresponding to the zone index, wherein the zone write pointer comprises a location in the active zone;
   writing, within an entry of the zone map data structure, a table index value that points to the entry of the high frequency update table; and
   journaling metadata of the entry of at least one of the zone map data structure or the high frequency update table affected by a flush transition between the zone map data structure and the high frequency update table.

20. The non-transitory computer-readable medium of claim 19, wherein, in response to an asynchronous power loss (APL) event, the plurality of operations further comprising flushing the zone map data structure and the high frequency update table to the NVM device.

* * * * *